Dec. 9, 1947.  I. SLOMAN  2,432,345
BLADE HOLDER AND REPLACEABLE BLADE
Filed April 29, 1944
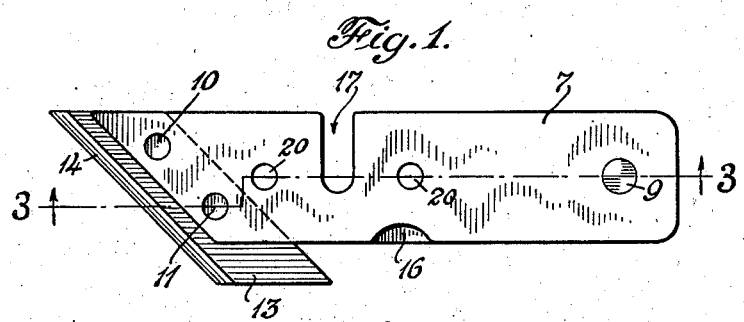
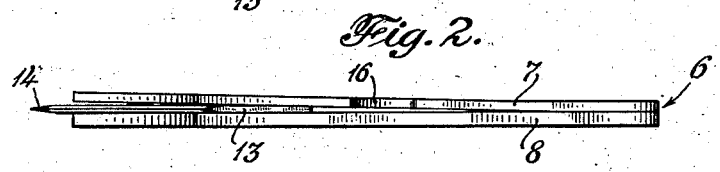
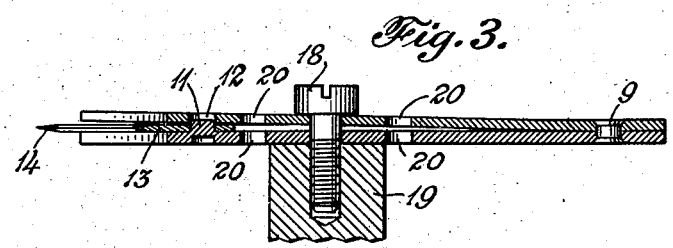
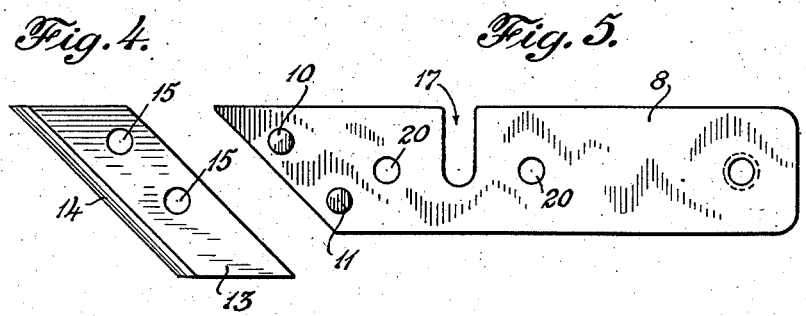
INVENTOR.
IRVING SLOMAN
BY
ATTORNEYS Patented Dec. 9, 1947

2,432,345

UNITED STATES PATENT OFFICE 2,432,345

BLADE HOLDER AND REPLACEABLE BLADE

Irving Sloman, New York, N. Y., assignor to Natural Casing Institute, Inc., New York, N. Y., a corporation of New York Application April 29, 1944, Serial No. 533,439

7 Claims. (Cl. 30—339)

1

The invention relates to a knife or blade and blade holder for use in industrial apparatus.

An object of the invention is to provide a knife which is constituted of a substantially rigid blade holder so constructed that a readily removable and replaceable cutting blade may be inserted thereinto and the blade holder, with the knife blade firmly retained therein, readily applied in position upon any apparatus in which the cutting instrumentality is to be utilized.

A specific type of apparatus in which a knife, such as the one forming the subject matter of the present invention may be utilized, is a sausage linker in which an endless length of sausage is automatically linked by compressing the length of sausage at regular intervals and tying a thread at such regular intervals. In such an apparatus, a metal blade or knife is conventionally used to sever the linker thread.

The knives in such an apparatus require frequent replacement and it is one of the objects of the present invention to provide a kife for such use which has a readily removable and replaceable blade element. A specific object of the invention is to provide a holder for such readily removable and replaceable blade which may be applied to its operative position with facility and dispatch.

A further object of the invention is to provide a construction of removable and replaceable blade holder which is of such structure that it will be held firmly in position by the screw or bolt by means of which it is applied in its operative position upon the apparatus and which will make possible the ready removal and replacement of a new blade into the holder, so that it can be utilized with new cutting blades without the necessity of replacing the entire knife structure. In accordance with the invention, therefore, I provide a cutting blade for such a knife structure which can be fabricated from portions of a conventional razor blade, as many as four such knife blades being capable of being cut from a single double-edge razor blade. Of course, the cutting blades for use with my novel knife structure may be fabricated specifically for utilization with my device.

In its broadest aspects, my novel knife is constituted of a bi-metallic blade holder in which one portion of the holder is made of a hard metal and the other of a yieldingly resilient metal. For instance, one-half of the blade holder may be formed of steel and the other of a resilient metal such as copper. Such a bi-metallic blade holder, by reason of the inherent

2 resiliency of the resilient metal portion thereof, facilitates the separation of the two parts of the holder for insertion therebetween of a knife blade. Thus, my bi-metallic blade holder is characterized by the rigidity of the hard metal component thereof and the springiness of the resilient metal component to permit the ready separation of the two component parts for insertion therebetween of the knife blade.

In my novel construction, for retaining the knife blade within the holder, I provide a pair of lugs depressed from and extending out of the surface of the hard metal component, which lugs, after passing through corresponding apertures provided in the knife blade, enter a pair of correspondingly positioned apertures in the resilient metal component of the holder, thereby firmly retaining the knife blade within the holder.

The provisions of the resilient metal component of the blade holder also makes possible the pressure of the screw with which the knife structure is retained in operative position, with a firmer grip upon the knife holder so that the resilient metal is enabled to conform readily and in better fashion to the surface of the knife blade.

A specific embodiment of my novel blade holder and blade is illustrated in the accompanying drawing, in which Fig. 1 is a plan view of the blade holder and blade; Fig. 2 is an edge view thereof; Fig. 3 is a section on the line 3—3 of Fig. 1 but showing the manner of securement, by means of a bolt, of the knife blade holder to a supporting block upon any apparatus; Fig. 4 is a plan view of the knife blade; and Fig. 5 is a plan view of the holder.

Referring more particularly to the drawing, in which the same reference characters identify the same parts in the several views, the knife blade holder generally designated as 6 is constituted of an upper section or component 7 of copper or similar comparatively soft metal, and a lower section or hard metal component 8 such as steel. The two sections or components 7 and 8 are superimposed and held together at one end by any suitable means, for instance, a rivet 9 and are separable at their opposite ends which are angularly disposed to the length of the blade holder.

The lower component 8 of hard metal, at a short distance inwardly from its angularly disposed transverse edge, has pressed upwardly therefrom a pair of lugs 10 and 11 which extend slightly above the upper surface of such component 8 and are adapted to enter into correspondingly configured and positioned apertures 12 in the upper component 7.

The removable and replaceable blade element is constituted of a thin steel strip 13 of rhomboid configuration having a cutting edge 14 which has two apertures 15 provided in its surface corresponding to the positions of lugs 10 and 11 in the lower component and apertures 12 in the upper component, so that the lugs, when the cutting blade is positioned in the holder, pass through such apertures 15 of the blade.

The blade 13 may be readily removed from or inserted into its position between the components 7 and 8 of the holder by separating the two components to a sufficient extent to slide the blade between them and cause the lugs 10 and 11 to pass through the apertures 15 of the blade. This action of separating the two components of the holder is facilitated by the provision of a cut-out or recess 16 at a point approximately midway the length of the upper component 7, i. e., that constituted of copper or a similar soft metal, so that the point of an ordinary pocket knife may be inserted at such recess 16 between the two components 7 and 8 and by the slight leverage action of the pocket knife, the portions 7 and 8 may be separated sufficiently to permit the insertion or removal of the blade 13 into or from its position between the component parts of the holder.

For application of my novel blade holder and removable and replaceable blade element to an apparatus in which it is to be utilized, I provide the transverse slot 17 by means of which a bolt 18 may be used to firmly secure the blade holder to any supporting structure 19 of the frame of the apparatus. Extending through the holder may be provided apertures 20 for engagement by appropriately positioned corresponding lugs upon an arm in a linker apparatus, for firmer securement of the blade holder in case the screw 18 is loosened.

It will be noted from Fig. 3 of the drawing that the pressure of the screw or bolt 18 against the soft metal component 7 will permit the firm securement of the blade holder to the supporting section 19 and that the comparative softness of the metal component 7 will cause its conformation more readily to the surface of the knife blade.

Upon the necessity of replacing the knife blade 13 it is only necessary to pry apart the two sections or components of the holder 7 and 8, so that the lugs 10 and 11 are withdrawn from the apertures 12 and 15 of the upper segment and blade respectively and remove the blade 13 and replace it by another blade.

I claim:

1. A knife blade holder for industrial apparatus comprising a holder constituted of two metal components of substantially equal thickness, one of a hard metal imparting rigidity to the component, and the other of a yieldingly resilient metal imparting relative flexibility to the said second component, secured together at one end of the holder and capable of being pried apart at the other end for the ready insertion thereinto and the removal therefrom of a knife blade.

2. A knife blade holder for industrial apparatus comprising a holder constituted of two metal components of substantially equal thickness, one of a hard metal imparting rigidity to the component, and the other of a yieldingly resilient metal imparting relative flexibility to the said second component, secured together at one end of the holder and capable of being pried apart at the other end for the ready insertion thereinto and the removal therefrom of a knife blade, the hard metal component having two upstanding lugs extending therefrom and the soft metal component having corresponding apertures for receiving said lugs.

3. A knife blade and a holder for industrial apparatus comprising a holder constituted of two metal components of substantially equal thickness, one of a hard metal imparting rigidity to the component, and the other of a yieldingly resilient metal imparting relative flexibility to the said second component, secured together at one end of the holder and capable of being pried apart at the other end for the ready insertion thereinto and the removal therefrom of a knife blade, the hard metal component having two upstanding lugs extending therefrom and the soft metal component having corresponding apertures for receiving said lugs, the blade having corresponding apertures for passage therethrough of the lugs from said hard metal component.

4. A knife blade and a holder for industrial apparatus comprising a holder constituted of two metal components of substantially equal thickness, one of a hard metal imparting rigidity to the component, and the other of a yieldingly resilient metal imparting relative flexibility to the said second component, secured together at one end of the holder and capable of being pried apart at the other end for the ready insertion thereinto and the removal therefrom of a knife blade, the hard metal component having two upstanding lugs extending therefrom and the yieldingly resilient metal component having corresponding apertures for receiving said lugs, the blade having corresponding apertures for passage therethrough of the lugs from said hard metal component, the resilient metal component having a recess along one edge to facilitate the prying apart of the two component sections of the blade holder.

5. A knife blade and a holder for industrial apparatus comprising a holder constituted of two metal components of substantially equal thickness, one of a hard metal imparting rigidity to the component, and the other of a yieldingly resilient metal imparting relative flexibility to the said second component, secured together at one end of the holder and capable of being pried apart at the other end for the ready insertion thereinto and the removal therefrom of a knife blade, the hard metal component having two upstanding lugs extending therefrom and the yieldingly resilient metal component having corresponding apertures for receiving said lugs, the blade having corresponding apertures for passage therethrough of the lugs from said hard metal component, the resilient metal component having a recess along one edge to facilitate the prying apart of the two component sections of the blade holder, the holder having a transverse slot extending partly across the width thereof for receiving a screw for the securement of the blade holder to its supporting structure in the apparatus.

6. A knife blade holder for industrial apparatus comprising a holder constituted of two metal components of substantially equal thickness, one of steel and the other of copper, secured together at one end of the holder and capable of being pried apart at the other end for the ready insertion thereinto and the removal therefrom of a knife blade.

7. A knife blade holder for industrial apparatus comprising a holder constituted of two metal components of substantially equal thickness, one of a hard metal imparting rigidity to the component, and the other of a yieldingly resilient metal imparting relative flexibility to the said second component secured together at one end of the holder, the yieldingly resilient metal component being capable of being separated at the other end of the holder from the hard metal component for the ready insertion between the two components, and the removal therefrom, of a knife blade.

IRVING SLOMAN.

REFERENCES CITED

The following references are of record in the file of this patent:

UNITED STATES PATENTS

| Number | Name | Date |
| --- | --- | --- |
| 854,915 | Speece | May 28, 1907 |
| 73,028 | Nauen | Jan. 7, 1868 |
| 1,827,509 | Ericsson | Oct. 13, 1931 |
| 1,556,613 | Ladeveze | Oct. 13, 1925 |
| 813,232 | Offutt | Feb. 20, 1906 |
| 1,163,061 | Beldoch | Dec. 7, 1915 |
| 1,336,087 | O'Shaughnessy | Apr. 6, 1920 |
| 1,745,103 | Lenze | Jan. 28, 1930 |
| 2,316,985 | Niedermayer | Apr. 20, 1943 |
| 1,570,478 | Goetz | Jan. 19, 1926 |

FOREIGN PATENTS

| Number | Country | Date |
| --- | --- | --- |
| 9,311 | Great Britain | 1911 |
| 88,329 | Austria | May 10, 1922 |